3,534,940
VALVE STEM PROTECTOR MEANS
John D. Whiteside, 3219 Pittari Place, New Orleans, La. 70114, and Jerrel A. Whiteside, 612 35th St., Nederland, Tex. 77627
Filed Nov. 13, 1967, Ser. No. 682,139
Int. Cl. F16k 51/00
U.S. Cl. 251—355     3 Claims

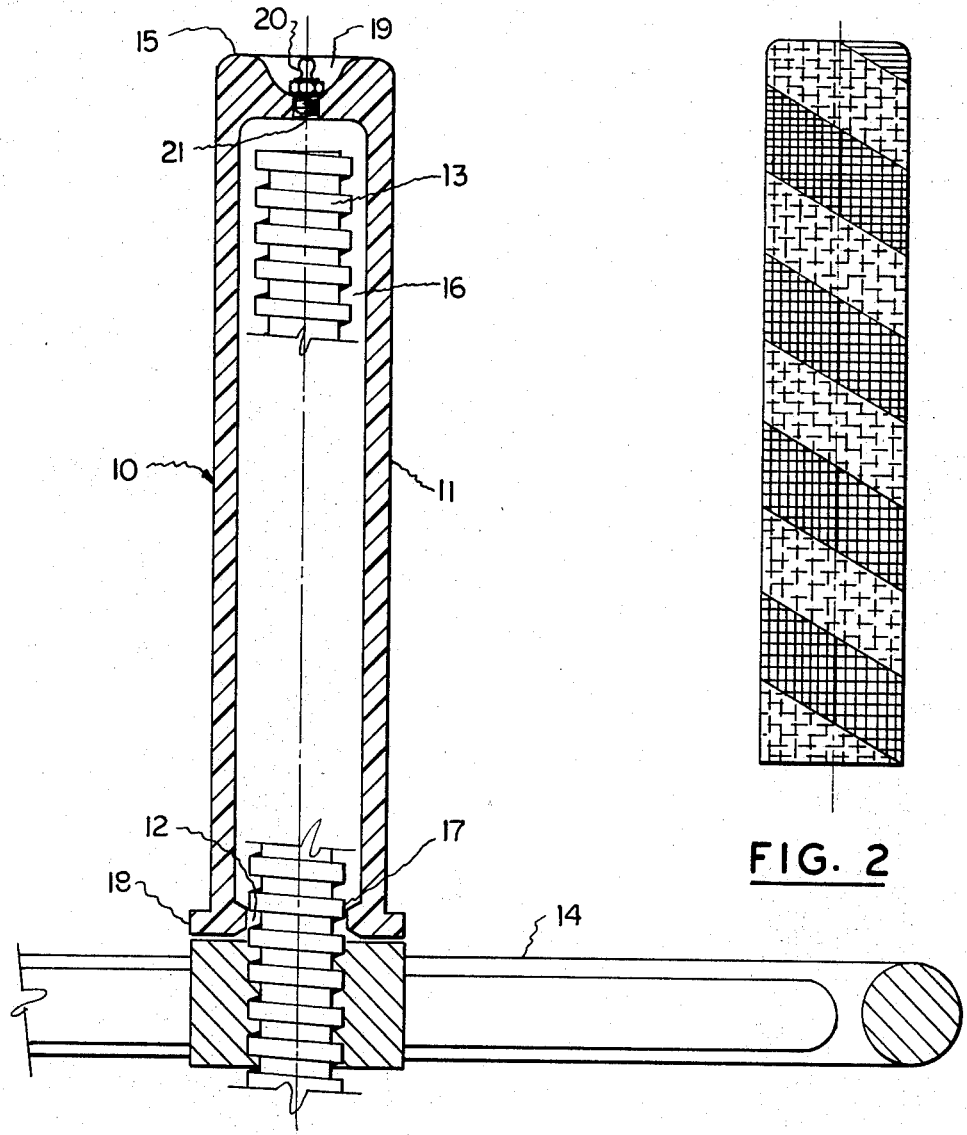

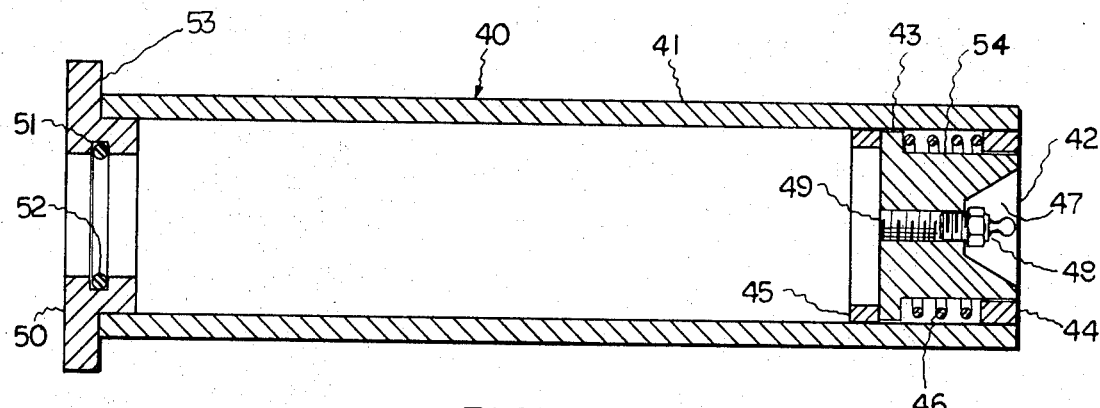
FIG. 3
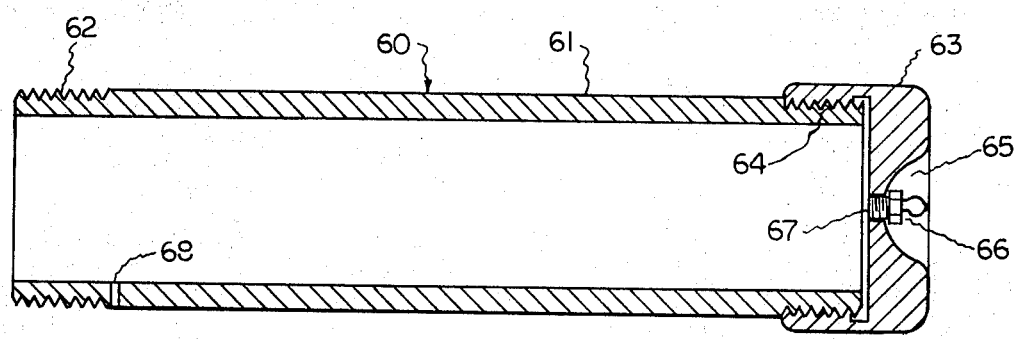
FIG. 6
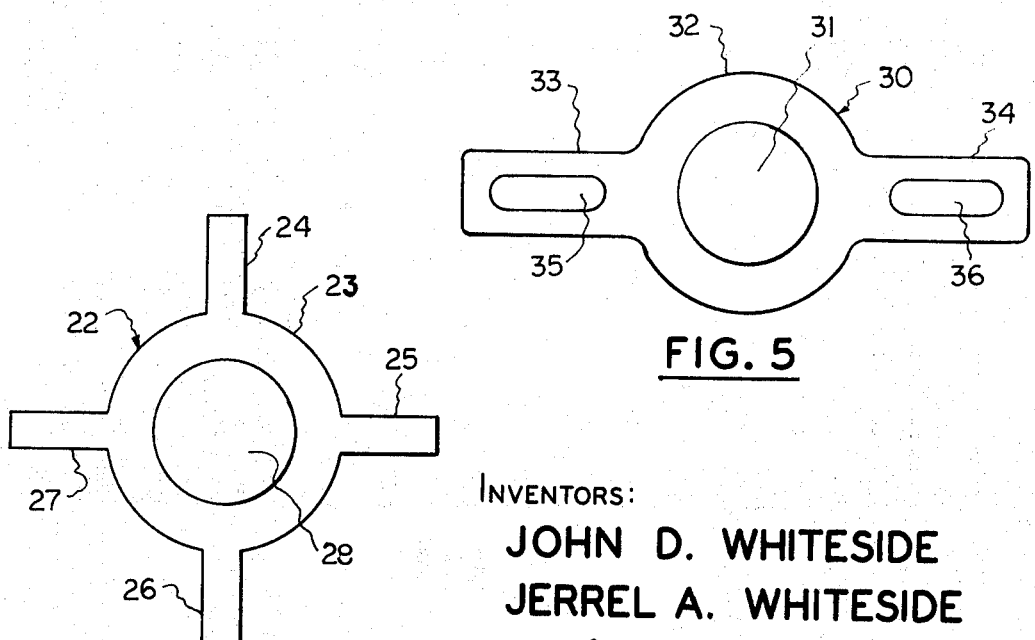
FIG. 5
FIG. 4
INVENTORS:
JOHN D. WHITESIDE
JERREL A. WHITESIDE
BY: Calvin J. Laiche
ATTORNEY

United States Patent Office 3,534,940
Patented Oct. 20, 1970

ABSTRACT OF THE DISCLOSURE

The present invention pertains to novel protector means for protecting the stem of a valve as well as serving as a safety device both as to personnel and protection to the valve. More particularly, the instant invention is concerned with protector means which fits over the stem portion of a rising stem type of valve whereby the stem is protected from the elements as well as maintained in a lubricated condition and whereby a valve stem in its raised condition is rendered conspicuous to thereby minimize contact and injury to an operator as well as damage to the valve stem.

The instant invention basically comprises an elongated essentially rigid tubular member which fits over the valve stem and which is provided with a grease fitting for lubricating a valve stem positioned within. Additionally, sealing means are provided for retaining a lubricant within the tubular member.

Among the many advantages and features of the instant invention is the fact that the present protector means can be provided in a limited number of different sizes yet a broad spectrum of many different sizes and makes of valves can be accommodated. Moreover, the present protector means can be made of various inexpensive materials and economically manufactured whereby they would be economically justifiable for any type of operation.

BACKGROUND OF THE INVENTION

The present invention pertains to that field of the prior art as embodied, inter alia, in class 70 sub-class 179, class 74, sub-class 509, class 137, sub-class 315, and class 251, sub-class 266 of the United States Patent Classification System.

Present day commercially available valve stem protectors are generally tailor made to accommodate a specific manufacturer's or supplier's valve, e.g., see U.S. Pats. 2,780,233; 3,011,359; and 3,055,632. Such valve stem protectors, including those designated and provided specifically for protecting the valve stem from the elements, are characterized as being relatively expensive. Accordingly, the additional cost of such protectors renders them economically unfeasible for many applications. This economic penalty quite often overshadows the desirability and need of these protectors as a safety device.

SUMMARY OF INVENTION

The protector means of the present invention for use with rising stem type of valves comprises an elongated essentially rigid tubular member adapted for housing the stem of a valve. The member has an open end portion which allows it to be fitted over the stem of a valve, its other end portion being closed. Grease fitting means are also provided in combination with the tubular member whereby grease can be injected into the member and thereby provide lubrication for a valve stem positioned within. The open end portion of the tubular member is preferably narrowed and can additionally be provided with suitable resilient sealing means to insure retention of the lubricant within the tubular member. The external surface of the tubular member is made of a conspicuous design, preferably colored yellow with black stripes thereon, whereby it will be readily discernible by an operator.

Another embodiment of the present invention includes a tubular member as above defined which is provided with a threaded portion at its open end portion whereby it can be screwed into the handwheel hardware of a valve on which it is to be installed.

By virtue of the present invention, any rising stem type valve can be readily provided with stem protection means at significantly much less costs than heretofore possible. In fact, the cost of the present valve stem protector means is so insignificant that it can be readily justified for all applications.

Another distinct advantage of the present protector over these prior art protectors is that a given size of the present protector means can accommodate a broad range of different valve sizes and makes regardless of their distinct shapes and designs. These and other advantages of the present invention will come to light as the discussion proceeds.

DESCRIPTION OF THE DRAWING

FIG. 1 represents a sectional view of the basic embodiment of the present protector means as installed upon a rising stem type of valve.

FIG. 2 depicts an external view of the present protector means showing how it is made to be conspicuous to an operator.

FIG. 3 represents a sectional view of a preferred embodiment of the present protector means.

FIG. 4 depicts suitable means for retaining the present protector means in a fixed position on a valve.

FIG. 5 depicts another form of suitable retaining means for use with the present protector means.

FIG. 6 represents yet another embodiment of the present protector means.

DESCRIPTION OF THE PREFERRED EMBODIMENT

The protector means 10 of the present invention basically comprises the elongated essentially rigid tubular member 11 which further comprises the open end portion 12 which is adapted for fitting over the stem 13 which forms a part of the valve means 14. The member 11 further comprises the closed end portion 15.

The tubular member 11 can be made out of virtually any material, however, a plastic material is preferred since there are many inexpensive plastics on the market today from which the present protector means can be readily fabricated in comparison to, for example, a metal such as steel. Additionally, these plastic materials generally offer excellent corrosion resistance to the elements and corrosive atmospheres encountered in many operations, e.g., acid fumes as found in chemical plants. Suitable plastic materials are, for example: polyethylene; polyvinyl chloride; polypropylene; styrenes; rubbers including synthetics; and the like.

The open end portion 12 of the member 11 is preferably provided with some sort of restriction to retain a lubricant within the member 11, that is, the chamber or annulus 16 defined between the threaded portion 13 and the inner peripheral wall of the member 11. As shown in FIG. 1, this can be accomplished by providing the collar or lip portion 17 which is of a diameter essentially equal to that of the threaded stem 13. The open end portion of the member 11 is also provided with the extension or collar 18 to aid the retention of the present means on a valve when employed in combination with clamping means as described hereinafter. Another suitable arrangement utilizing a resilient sealing means is that as depicted in FIG. 3 described in detail hereinafter.

The closed end portion 15 of the member 11 is preferably provided with the indented or recessed portion 19 in which the grease fitting 20 is positioned. The grease fitting 20 is either screwed or pressed into the end wall of the member 11 and is in open communication with the chamber 16 therein by virtue of the aperture 21. The end portion 15 is recessed so as to remove the possibility of any damage to the fitting 20 or even more important, personal contact with the fitting by an operator.

In operation, the member 11 is placed over the stem 13 when the latter is in a raised position or in other words, when the stem extends out of the valve. Grease is injected within the annulus 16 between these members by virtue of the grease fitting 20. In this manner, the stem 13 is protected from the elements and any corrosive atmosphere as well as possible physical damage to the stem. When the stem 13 is screwed all of the way in, the member 11 can be mounted to the valve 14 by virtue of a chain or similar means whereby it would hang adjacent the valve for replacement by the operator upon manipulating the valve and raising its stem. Or as preferred, the protector means can be retained in place above the valve by virtue of the means depicted in FIGS. 4 and 5.

The fastening means 22 of FIG. 4 comprises the central portion 23 to which is united the extended portions 24, 25, 26, and 27 which radiate outwards from the aperature or hole 28 within the center portion 23. The member 22 is made of a pliable material, e.g., soft steel or tin, whereby the members 24 through 27 can be easily bent to conform to the super-structure or internal network of a valve handle. The hole 28 is sufficiently large so as to slidably fit over the outside or external diameter of the member 11 over which it is slid into position in the region of the open end portion 12 against the lip 18. In that position, the extendeded portions or arms 24 through 27 are then bent downwards or away from the member 11 so as to engage the center or inner portion of the valve handle. The members 24 through 27 are to be bent into contact and engage only that portion of the valve handle which rotates with the valve wheel.

Another means of retaining the protector means 10 on a valve when the stem has been screwed inwards is by virtue of the means 30 of FIG. 5. The retaining means 30 is provided with the hole 31 which is of a diameter sufficient to receive the member 11. The centrol portion 32 of the means 30 is provided with the extensions 33 and 34 which are bent away from the member 11 into contact with the handwheel of the valve 14. The elongated holes or slots 35 and 36 are provided whereby the extensions 33 and 34 can be bolted or fastened to the handwheel of the valve 14. Additionally, these extensions could be merely bent around the inner portion of a valve handwheel as the means of FIG. 4.

As brought out above, the present protector means is preferably made to be conspicuous for easy detection by an operator. Referring to FIG. 2, this is preferably accomplished by striping the external surface of the member 11 with suitable colors, preferably black stripes on a yellow background. In this manner, the protector means is readily discernable by an operator whereby contact with his person is minimized. Additionally, should contact be made, then the extent of his injury is minimized. Of course, there are other related safety advantages of the present protector means. For example, to prevent physical damage to a valve stem or damage by corrosion where a valve is difficult to operate due to a damaged stem or from lack of lubrication, it is common practice to employ a cheater on the valve handwheel whereby an operator can be injured upon its slippage or a valve damaged even to the extent of rupturing thereby endangering the operator.

The protector means 40 of FIG. 3 represents an even more preferred embodiment of the present invention. In that embodiment, the tubular member 41 is provided with the slidably arranged end portion comprising tha cap member 42. The member 42 is provided with the extended or flanged portion 43 which is of a diameter somewhat less than the inside diameter of the tubular member 41. In this manner, the member 42 slidably fits within the member 41. The cap member 42 is retained within the tubular member 41 by virtue of the retaining rings 44 and 45. The retaining ring 45 is provided as a stop for preventing the cap 42 from extending too far inwards. The resilient or spring means 46 is positioned between the retaining ring 44 and the bottom flanged portion 43 of the cap member 42 whereby the member 42 is constantly urged inwards for the reasons hereinafter mentioned. The member 42 is also provided with the recessed or indented portion 47 wherein the grease fitting 48 is positioned. The end wall of the member 42 is provided with the aperture 49 wherein the grease fitting 48 is screwed or press fitted. In this manner, grease can be injected within the member 41 via the grease fitting 48. The external peripheral surface of the member 42 is preferably of a conspicuous color and/or design, e.g., red, whereby any protrusion of the member 42 from within the tubular member 41 is readily visible for the reasons as described hereinbelow.

At its open end which fits over the stem of a valve on which the protector means 40 is positioned, the tubular member 41 is provided with the collar member 50 which slidably fits within and engages the inner peripheral surface of the member 41. The member 50 is preferably provided with the groove 51 along its internal peripheral surface lying parallel to and adjacent to that of the valve stem. The resilient means 52, e.g., a rubber O-ring or the like, are provided for retaining lubricant within the member 51. The collar 50 is provided with the flanged portion or extension 53 which serves the same function as the lip 18 of the embodiment of FIG. 1 when attaching the protector 40 to a valve.

In operation, when the protector means 40 is installed upon a valve by virtue of the retaining means 22 or 30 and upon raising the stem 13 (FIG. 1) of the valve 14 to a fully raised position, the top of the stem contacts the movable head member 42 whereupon it is caused to slide outwards of the member 41. Under such conditions, the surface 54 is then visible to an operator and this indicates to him that the stem is fully extended. Conversely, moving the stem 13 in the opposite direction, that is, the member 42 is returned to its former position by the resilient means 45 as shown in the drawing, the operator is thus advised that the stem has been screwed inwards.

FIG. 6 depicts yet another embodiment of the present invention that is suitable for use with certain types of valves that have been provided with a threaded portion on top of the handwheel. The protector means 60 similarly comprises the tubular member 61 which is threaded at its open end portion 62. This threaded portion in turn screws within a mating threaded portion of a valve handwheel assembly. The other end of the member 61 is provided, for example, with the threaded cap member 63 which is united to the member 61 by virtue of the threaded portion 64 thereof. The member 63 is provided with the indented or recessed portion 65 wherein the grease fitting 66 is positioned, being press fitted or screwed in the aperture 67 provided in the end wall of the member 63. In this arrangement, since the member 61 is threaded to the handwheel and thereby does not provide any escape port for a lubricant, in the absence of which a lubricant can not be injectel within, the port or aperture 68 is provided. The operator upon injecting grease within the member 61 by virtue of the grease fitting 66 observes the port 68 and upon grease being injected through the port 68, the operator is then made aware that sufficient lubricant has been injected.

While we have described our invention with particular emphasis on our preferred embodiments, it would be apparent to one skilled in the art that various modifications can be made in the above without departing from the true scope and spirit of our invention. For example, the location of the grease fitting in any of the embodiments is not critical inasmuch as it may be located in the side wall of the tubular member. Moreover, different retaining means from that shown in FIGS. 4 and 5 above can be employed and still achieve the same overall effects. For example, the collar 49 can be bolted directly to the top portion or structure of a valve handwheel. The tubular member can be provided with various other holding means such as a clamp, whereby a chain or other similar medium can be united thereto and attached to the valve. Or, the open end or flanged portion of the tubular member can be provided with a series of holes whereby wire can be passed through the holes and around the spokes within the valve handwheel so as to maintain the tubular member in a fixed operable position when the stem is screwed all of the way within the valve. It can be further appreciated that the movable end portion of the embodiment 40 of FIG. 3 can be readily adapted for use in the embodiments of FIGS. 1 and 6. What we specifically intend to cover by United States Letters Patent is that as set forth in the appended claims.

We claim:

1. Protector means for a rising stem type of valve comprising:
   (a) an elongated tubular member adapted for housing the stem of a valve, one end portion of said tubular member being closed and its other end portion being open and adapted to fit over the end of a valve stem when in an operable position, said open end portion further comprising a flanged portion of sufficient diameter for retention by retaining means as defined hereinafter;
   (b) grease fitting means in combination with said tubular member whereby grease can be injected into said tubular member and thereby provide lubrication for valve stem means positioned within; and
   (c) retaining means in combination with said tubular member for fastening said member to a valve handwheel in a fixed position, said retaining means being further defined as comprising a central portion having a hole therein of sufficient diameter to receive said tubular member such that it grips said tubular member around its flanged portion, said retaining means further comprising a series of extended portions radiating outward from the center of said central portion, said extended portions being pliable whereby they can be attached to the inner structure of a valve handwheel for retention of the entire assembly upon the valve.

2. The protector means of claim 1 further characterized in that;
   said elongated tubular member is provided with a conspicuous external surface whereby said protector means is readily discernable.

3. The protector means of claim 1 further characterized in that;
   said elongated tubular member (a) is further defined in that its closed end portion further comprises:
   (1) cap means adapted to slidably fit within said tubular member (a);
   (2) means for retaining said cap means within said member (a);
   (3) resilient means spaced between said retaining means and said cap means for urging said cap means inwards at all times, said cap means being forceably injected from within said tubular member (a) upon extending a valve stem therein into contact with said cap means whereby the position of the valve stem is indicated; and
   (4) stop means positioned within said tubular member (a) to prevent said cap means (a-1) from disengaging said retaining means (a-2).

References Cited

UNITED STATES PATENTS

| | | | |
|---|---|---|---|
| 1,664,694 | 4/1928 | Lovvorn | 137—382 |
| 2,578,630 | 12/1951 | Hartman | 137—382 XR |
| 2,816,566 | 12/1957 | Warren | 251—355 XR |
| 2,890,710 | 6/1959 | Hartman | 251—355 XR |
| 3,013,769 | 12/1961 | Volpin | 251—355 XR |
| 3,064,674 | 11/1962 | Carfagna | 251—355 XR |
| 3,071,343 | 1/1963 | Milleville | 251—355 XR |
| 3,107,685 | 10/1963 | Scaramucci | 251—355 XR |

FOREIGN PATENTS 641,895  5/1962  Canada.

SAMUEL SCOTT, Primary Examiner

U.S. Cl. X.R.

137—377